(12) United States Patent  
Hwang et al.

(10) Patent No.: US 10,903,714 B2  
(45) Date of Patent: Jan. 26, 2021

(54) MOTOR

(71) Applicant: LG ELECTRONICS INC., Seoul (KR)

(72) Inventors: Eunji Hwang, Seoul (KR); Sunggi Kim, Seoul (KR); Hangjin Ban, Seoul (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 15/703,369

(22) Filed: Sep. 13, 2017

(65) Prior Publication Data

US 2018/0076684 A1   Mar. 15, 2018

(30) Foreign Application Priority Data

Sep. 13, 2016   (KR) .................. 10-2016-0118058

(51) Int. Cl.
| | |
|---|---|
| *H02K 5/173* | (2006.01) |
| *H02K 5/20* | (2006.01) |
| *A47L 9/00* | (2006.01) |
| *A47L 9/22* | (2006.01) |
| *H02K 9/06* | (2006.01) |

(52) U.S. Cl.
CPC .......... *H02K 5/1732* (2013.01); *A47L 9/0081* (2013.01); *A47L 9/22* (2013.01); *H02K 5/20* (2013.01); *H02K 9/06* (2013.01); *H02K 2213/09* (2013.01)

(58) Field of Classification Search
CPC .......... H02K 5/1732; H02K 5/15; H02K 5/16; H02K 5/167; H02K 5/173; H02K 7/09; H02K 7/08

USPC .......... 310/12.31, 62, 63, 90, 90.5, 401, 425
See application file for complete search history.

(56) References Cited

U.S. PATENT DOCUMENTS

| | | | |
|---|---|---|---|
| 4,514,458 A | 4/1985 | Thorn | |
| 2003/0169951 A1* | 9/2003 | Nishijima | F16C 27/02 384/103 |
| 2007/0096572 A1* | 5/2007 | Watkins | F16C 27/04 310/90 |
| 2015/0333592 A1* | 11/2015 | Yin | H02K 5/1737 310/51 |
| 2017/0204868 A1* | 7/2017 | Oshita | F02B 39/10 |

FOREIGN PATENT DOCUMENTS

| | | |
|---|---|---|
| DE | 102005010459 A1 | 9/2006 |
| DE | 102005025261 A1 | 12/2006 |
| EP | 2899414 A1 | 7/2015 |

(Continued)

OTHER PUBLICATIONS

Extended European Search Report in European Application No. 17190141.6, dated Feb. 13, 2018, 7 pages.

*Primary Examiner* — Nguyen Tran  
(74) *Attorney, Agent, or Firm* — Fish & Richardson P.C.

(57) ABSTRACT

A motor includes a motor housing, a rotating shaft assembly that includes a rotor mounted to the rotating shaft, an impeller connected to the rotating shaft, and an impeller cover that surrounds an outer circumference of the impeller. The impeller cover defines an air inlet. The motor further includes a stator that is located within the motor housing and that surrounds at least a portion of the rotor, a bearing mounted to the rotating shaft, and an elastic mesh having a plurality of pores. The elastic mesh is disposed between the motor housing and the bearing.

16 Claims, 11 Drawing Sheets

(56) References Cited

FOREIGN PATENT DOCUMENTS

| | | |
|---|---|---|
| JP | 11252851 | 9/1999 |
| KR | 101287468 | 2/2008 |
| KR | 10-2016-0097885 | 8/2016 |

\* cited by examiner

MOTOR

CROSS-REFERENCE TO RELATED APPLICATIONS

The present application claims priority under 35 U.S.C. §§ 119 and 365 to Korean Patent Application No. 10-2016-0118058, filed on Sep. 13, 2016, which is hereby incorporated by reference in its entirety.

FIELD

The present disclosure relates to a motor, and more particularly, to a motor that includes a bearing disposed in a motor housing to support a rotating shaft of the motor.

BACKGROUND

A motor may be installed in a household appliance such as a vacuum cleaner. For example, a motor in a vacuum cleaner may generate a driving force for suctioning dust into a dust collecting part.

An example motor may include a motor housing, a stator installed in the motor housing, a rotor rotated by the stator, and a rotating shaft having the rotor mounted thereon.

In some cases, the rotating shaft of the motor may be supported by at least two bearings. The rotating shaft may be rotated at high speed while being supported by the at least two bearings.

The at least two bearings may be mounted at different positions of the rotating shaft. The at least two bearings may simultaneously support the rotating shaft at positions spaced apart from each other. Any one of the at least two bearings may be disposed in the motor housing, and the rotating shaft may be rotatably supported by the bearing disposed in the motor housing.

In some examples, the motor may include an assembly of a plurality of parts that have an assembly tolerance. In some cases, a bearing disposed in the motor housing can be distorted due to the assembly tolerance. In these cases, abrasion of the bearing disposed in the motor housing may increase, and the lifespan of the bearing disposed in the motor housing may be shortened.

SUMMARY

A motor is provided to minimize abrasion of a bearing accommodated in a motor housing and to achieve efficient heat dissipation.

According to one aspect of the subject matter described in this application, a motor includes: a motor housing; a rotating shaft assembly that includes a rotor mounted to the rotating shaft; an impeller connected to the rotating shaft; an impeller cover that surrounds an outer circumference of the impeller, the impeller cover defining an air inlet; a stator that is located within the motor housing and that surrounds at least a portion of the rotor; a bearing mounted to the rotating shaft; and an elastic mesh having a plurality of pores, the elastic mesh being disposed between the motor housing and the bearing.

Implementations according to this aspect may include one or more of following features. The bearing may include, an inner rim fixed to the rotating shaft, an outer rim spaced apart from the inner rim, and a rolling member disposed between the inner rim and the outer rim. The motor housing may include a hollow part that has an internal diameter greater than an external diameter of the outer rim of the bearing. The elastic mesh may be disposed between the hollow part and the outer rim of the bearing.

In some implementations, the elastic mesh contacts the outer rim and the hollow part. The motor housing may include a body part that defines at least one through-hole facing the elastic mesh, and a hollow part that protrudes from the body part and that surrounds an outer circumference of the elastic mesh.

In some implementations, the motor housing may include a body part and a hollow part that protrudes from the body part and that surrounds an outer circumference of the elastic mesh. The bearing comprises an inner rim fixed to the rotating shaft, an outer rim spaced apart from the inner rim, and a rolling member disposed between the inner rim and the outer rim. In some examples, at least a portion of the elastic mesh may be disposed between an inner circumference of the hollow part and an outer circumference of the outer rim.

In some implementations, the motor may further include a wave washer that is disposed between the outer rim and the body part and spaced apart from the elastic mesh in which the body part includes a mounting projection that protrudes from the body part and that seats the elastic mesh. In some examples, the mounting projection may surround an outer circumference of the wave washer. In some cases, the mounting projection may have a height greater than a height of the wave washer.

In some implementations, the body part may include a wave washer mounting surface that seats the wave washer in which the mounting projection is stepped from the wave washer mounting surface. The elastic mesh may include a first elastic mesh part disposed between the inner circumference of the hollow part and the outer circumference of the outer rim, and a second elastic mesh part bent from the first elastic mesh part and disposed between the outer rim and the body part. In some examples, the body part may define a through-hole that faces at least one of the first elastic mesh part or the second elastic mesh part.

In some implementations, the second elastic mesh part may contact both of the body part and the outer rim of the bearing. The second elastic mesh part may define a space between the body part and the inner rim of the bearing and is configured to deform in a direction parallel with the rotating shaft.

In some implementations, the elastic mesh may include a metal wire mesh in which at least one metal wire has a curled shape including one or more of curved sections. In some examples, the elastic mesh may have a hollow cylindrical shape in which each pore of the plurality of pores may have an opening in a radial direction of the elastic mesh. The elastic mesh may have a height greater than a height of the bearing.

In some implementations, the motor may further include an O-ring that is fixed to the rotating shaft, that is located between the elastic mesh and the rotating shaft, and that supports the bearing. The O-ring may have an external diameter less than an internal diameter of the elastic mesh to thereby define a gap between an outer circumference of the O-ring and the elastic mesh.

In some implementations, the elastic mesh may be configured to deform in a radial direction based on the rotating shaft becoming offset from a center axis of the bearing. In some examples, the elastic mesh may be configured to communicate air through the through-hole and to discharge air to an outside of the motor housing. In some cases, the mounting projection may have a first surface that contacts the elastic mesh and a second surface that contacts the wave washer.

DETAILED DESCRIPTION

Hereinafter, exemplary implementations of the present disclosure will be described in detail with reference to the accompanying drawings.

Figure 1:
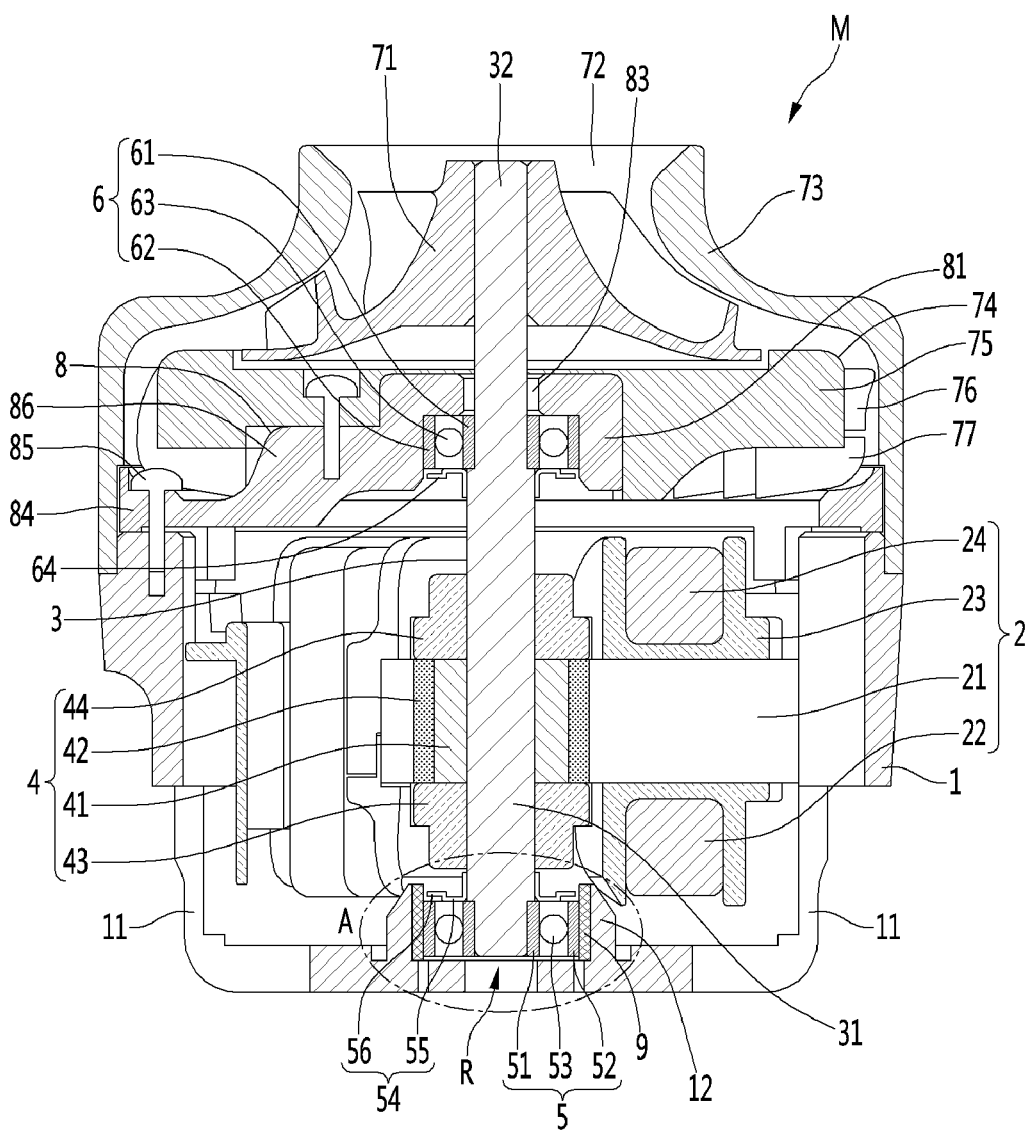
FIG. 1 is a sectional view showing an example motor.
Figure 2:
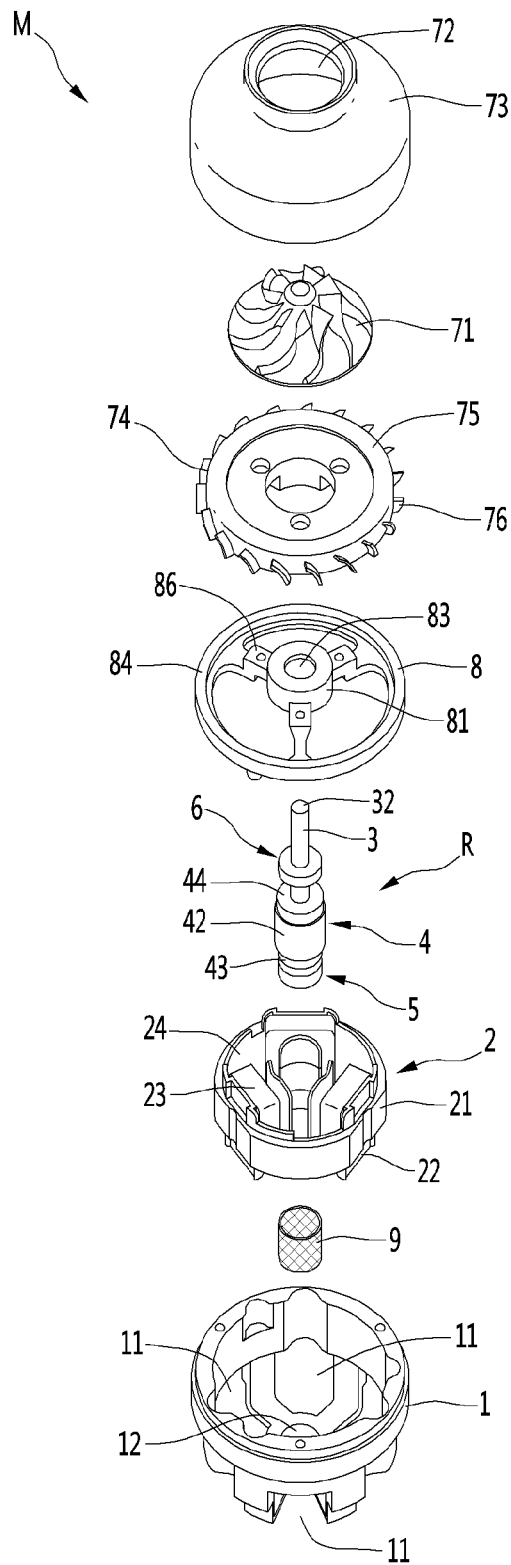
FIG. 2 is an exploded perspective view showing the example motor.
Figure 3:
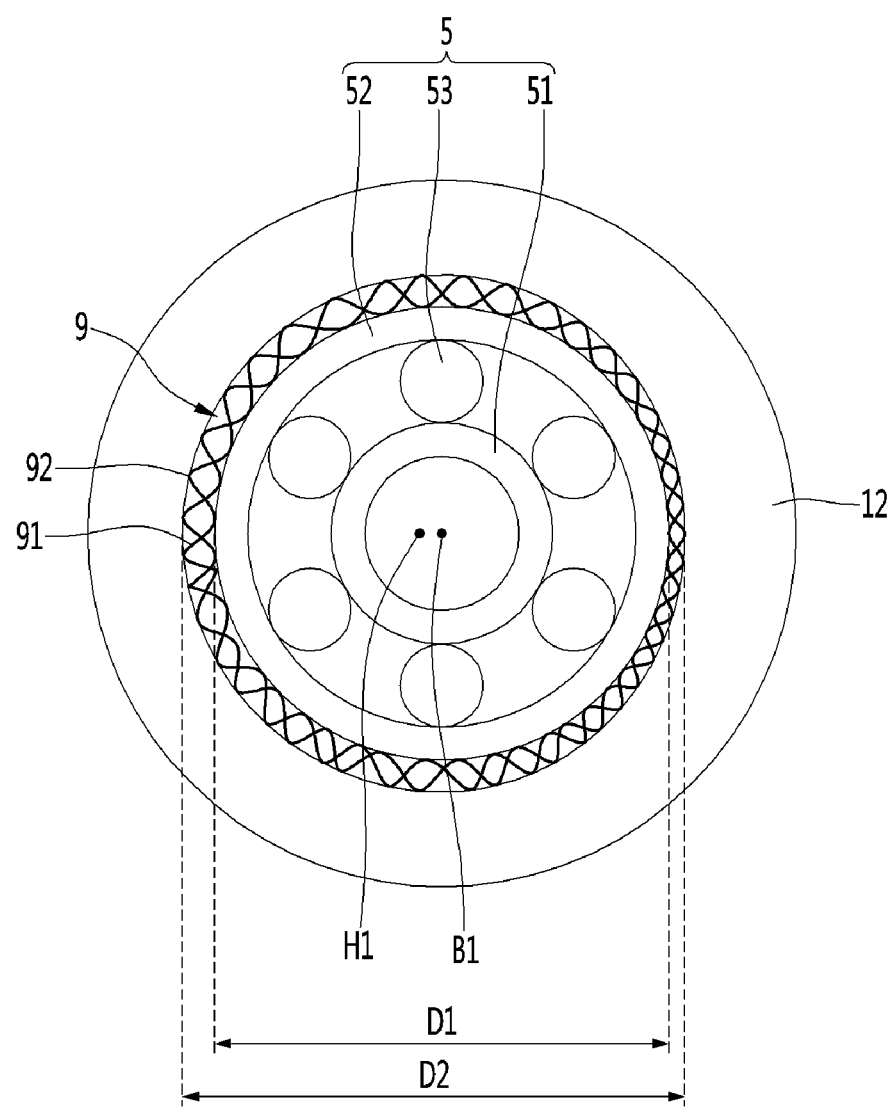
FIG. 3 is an enlarged sectional view of portion A of FIG. 1.
Figure 4:
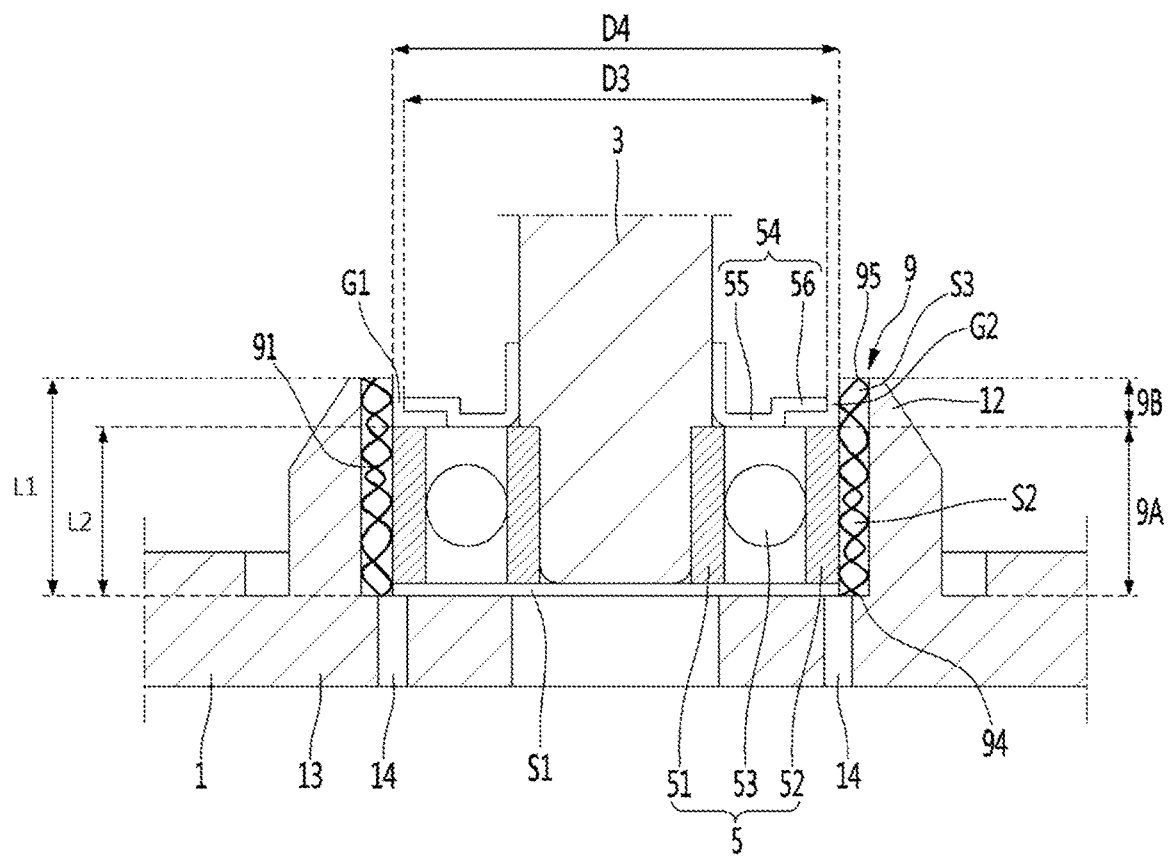
FIG. 4 is a cross-sectional view showing an example elastic mesh that has been elastically deformed by an example bearing.

FIG. 1 is a sectional view showing a first example motor. FIG. 2 is an exploded perspective view showing the motor. FIG. 3 is an enlarged sectional view of portion A of FIG. 1. FIG. 4 is a cross-sectional view showing an example elastic mesh that is elastically deformed by an example bearing in the first example motor.

The motor M of this implementation includes, for example, a motor housing 1, a rotating shaft assembly R, and a stator 2.

The motor housing 1 may form an external appearance of the motor M. The motor housing 1 may have a hollow cylindrical shape having one open surface. An air outlet 11 through which air inside the motor housing 1 is discharged to the outside may be formed in the motor housing 1. A plurality of air outlets 11 may be formed in the motor housing 1.

The rotating shaft assembly R includes a rotating shaft 3 and a rotor 4 mounted to the rotating shaft 3.

The stator 2 may be installed in the motor housing 1 to surround the rotor 4. The stator 2 may be mounted to the motor housing 1 using a fastening member such as screw. The stator 2 may be formed in a hollow cylindrical shape, and may surround the outer circumference of the rotor 4.

The stator 2 may be configured as an assembly of a plurality of members. The stator 2 may include a stator core 21, a pair of insulators 22 and 23 coupled to the stator core 21, and a coil 24 disposed at the insulators 22 and 23.

The rotating shaft 3 is rotated together with the rotor 4, and may be supported by a bearing 5. The rotating shaft 3 may be rotated by the rotor 4.

A portion of the rotating shaft 3 may be located inside the motor housing 1, and the rest of the rotating shaft 3 may be located inside an impeller cover 73 which will be described later. The rotating shaft 3 may be disposed long from the inside of the motor housing 1 to the inside of the impeller cover 73.

In some implementations, an impeller connection part 32 to which an impeller 71 is connected may be formed at the rotating shaft 3. The impeller connection part 32 may be formed at a position spaced apart from a part 31 surrounded by the rotor 4. The impeller connection part 32 may be formed at an end portion of the rotating shaft 3.

A bearing mounting part at which the bearing 5 is mounted may be formed at the rotating shaft 3. In some implementations, a second bearing mounting part at which a second bearing 6 which will be described later is mounted may be formed at the rotating shaft 3.

The rotor 4 may be mounted to surround a portion of the rotating shaft 3. The rotor 4 may be rotatably located inside the stator 2. The rotor 4 may be formed in a hollow cylindrical shape.

The rotor 4 may include an iron core 41 fixed to the rotating shaft 3, a magnet 42 installed at the iron core 41, and a pair of end plates 43 and 44 that fix the magnet 42.

The rotor 4 may be mounted to surround the part 31 between one end and the other end of the rotating shaft 3. The rotor 4 may be mounted between the impeller connection part 32 and the bearing mounting part.

The motor M includes the bearing 5 mounted to the rotating shaft 3, and an elastic mesh 9 disposed between the motor housing 1 and the bearing 5, the elastic mesh 9 having a plurality of pores S2 and S3 formed therein.

In some implementations, the motor M may further include the impeller 71 connected to the rotating shaft 3, and the impeller cover 73 surrounding the outer circumference of the impeller 71, the impeller cover 73 having an air inlet 72 formed therein.

The bearing 5 may include an inner rim 51 fixed to the rotating shaft 3, an outer rim 52 spaced apart from the inner rim 51, and a rolling member 53 disposed between the inner rim 51 and the outer rim 52.

The bearing 5 may be one of a roller bearing and a ball bearing. The bearing 5 is preferably configured as a ball bearing in which the rolling member 53 is configured as a ball to have high performance in high-speed rotation.

In some implementations, the bearing 5 may be mounted to the rotating shaft 3 to be located inside the motor housing 1. An example hollow part 12 larger than the bearing 5 may be formed in the motor housing 1. The hollow part 12 may be formed larger than the bearing 5. A gap in which at least a portion of the elastic mesh 9 is inserted and accommodated may be formed between the hollow part 12 and the bearing 5. The bearing 5 and the elastic mesh 9 may be accommodated together in the hollow part 12.

As shown in FIG. 3, the internal diameter D2 of the hollow part 12 may be formed greater than the external diameter D1 of the bearing 5, and at least a portion of the elastic mesh 9 may be disposed between the inner circumferential surface of the hollow part 12 and the outer circumferential surface of the bearing 5. The internal diameter D2 of the hollow part 12 may be greater than the external diameter D1 of the outer rim 52 of the bearing 5, and the elastic mesh 9 may be disposed between the outer rim 52 of the bearing 5 and the hollow part 12.

The motor housing 1, as shown in FIG. 4, may include the hollow part 12 and an example body part 13. The hollow part 12 may protrude from the body part 13 and surround the outer circumference of the elastic mesh 9. The hollow part 12 may protrude toward the rotor 4 shown in FIG. 1 from the body part 13.

At least one through-hole 14 facing the elastic mesh 9 may be formed in the body part 13.

A plurality of through-holes 14 may be formed in the body part 13. The plurality of through-holes 14 may be formed in the body part 13 to be spaced apart from one another in the circumferential direction. The plurality of through-holes 14 may face a partial area of the elastic mesh 9.

A flow path through which air passes may be formed between the hollow part 12 and the bearing 5, and the air may be guided to the flow path between the hollow part 12 and the bearing 5 by the through-hole 14 formed in the body part 13. The elastic mesh 9 may be disposed in the flow path formed between the hollow part 12 and the bearing 5, and heat transferred from the bearing 5 can be efficiently dissipated by the elastic mesh 9.

The motor M may further include an O-ring 54 fixed to the rotating shaft 3, the O-ring 54 supporting bearing 5.

The O-ring 54 may be fixed to the rotating shaft 3, and may constitute a rotating shaft assembly (or rotor assembly) together with the rotating shaft 3 and the rotor 4.

The O-ring 54 may be located between the bearing 5 and the rotor 4 in the length direction of the rotating shaft 3. The O-ring 54 may restrict the bearing 5 from moving toward the rotor 4. The O-ring 54 may serve as a bearing stopper supporting the bearing 5.

The O-ring 54 may be fixed to the rotating shaft 3 to come in contact with a portion of the bearing 5. At least one portion of the O-ring 54 may face the inner rim 51 of the bearing 5. The O-ring 54 may come in contact with the inner rim 51 of the bearing 5. The O-ring 54 may be a bearing stopper that restricts the inner rim 51 of the bearing 5 from sliding toward the rotor 4.

As shown in FIG. 4, the external diameter D3 of the O-ring 54 may be smaller than the internal diameter D4 of the elastic mesh 9. The O-ring 54 may be located inside the elastic mesh 9. When the rotating shaft 3 rotates, the O-ring 54 may be rotated in a space formed inside the elastic mesh 9.

A gap G1 may be formed between the outer circumference of the O-ring 54 and the elastic mesh 9, and the O-ring 54 and the elastic mesh 9 do not come in contact with each other due to the gap G1.

Abrasion of the O-ring 54 or the elastic mesh 9, which occurs when the O-ring 54 and the elastic mesh 9 comes in contact with each other, can be minimized due to the gap G1. For example, the lifespan of each of the O-ring 54 and the elastic mesh 9 can be maximized due to the gap G1 formed between the outer circumference of the O-ring 54 and the elastic mesh 9.

In some implementations, the gap G1 between the outer circumference of the O-ring 54 and the elastic mesh 9 may form a flow path through which the air inside the motor M can be flowed into the bearing 5 and the elastic mesh 9. The air inside the motor M is flowed into the bearing 5 and the elastic mesh 9 through the gap G1 between the outer circumference of the O-ring 54 and the elastic mesh 9, to dissipate heat of each of the bearing 5 and the elastic mesh 9.

The O-ring 54 may be mounted to the rotating shaft 3 to come in contact with the inner rim 51 of the bearing 5. The O-ring 54 may be spaced apart from each of the outer rim 52 of the bearing 5 and the elastic mesh 9.

The O-ring 54 may include an inner ring 55 coming in contact with the inner rim 51 and an outer ring 56 spaced apart from the outer rim 52.

The outer circumference of the outer ring 56 may be the outer circumference of the O-ring 54, and the external diameter of the outer ring 56 may be the external diameter of the O-ring 54.

In some implementations, the body part 13 of the motor housing 1 may be spaced apart from the O-ring 54, and a bearing accommodation space S1 in which the bearing 5 is accommodated may be formed between the O-ring 54 and the body part 13.

The impeller 71 may be rotated together with the rotating shaft 3 in the state in which the impeller 71 is connected to the rotating shaft 3. The impeller 71 may be located between the impeller cover 73 and a diffuser 74 which will be described later.

The impeller cover 73 may protect the impeller 71 by surrounding the outer circumference of the impeller 71.

A surface of the impeller cover 73, which is opposite to the motor housing 1, may be open. The impeller cover 73 may be disposed to cover an open surface of the motor housing 1. The impeller cover 73 may be coupled to the motor housing 1 or a bracket 8 using a fastening member such as a screw, or may be screw-coupled to the motor housing 1 or the bracket 8.

The air inlet 72 may be formed smaller than the surface of the impeller cover 73, which is opposite to the motor housing 1.

The inner circumferential surface of the impeller cover 73 may be spaced apart from the impeller 71, and air flowed by the impeller 71 may be flowed between the inner circumferential surface of the impeller cover 73 and the impeller 71.

In some implementations, the motor M may further include the diffuser 74 located inside the impeller cover 73. The diffuser 74 may be mounted to at least one of the impeller cover 73 and the bracket 8.

The diffuser 74 may include a body part 75 having a smaller size than the impeller cover 73, a diffuser vane 76 protruding from the outer circumference of the body part 75, and a guide vane 77 guiding air flowed by the diffuser vane 76 to the stator 2 and the rotor 4.

The diffuser vane 76 may be formed to the dynamic pressure of air passing through the impeller 71 to static pressure.

The guide vane 77 may guide air of which pressure is increased by the diffuser vane 76 to the stator 2 and the rotor 4.

In some implementations, the rotating shaft 3 may be directly supported by the bracket 8 which will be described later. When the rotating shaft 3 is directly supported by the bracket 8, a rotating shaft support part rotatably supporting the rotating shaft 3 may be formed at the bracket 8. The rotating shaft support part may be formed at the bracket 8 to surround the outer circumference of the rotating shaft 3. A lubrication medium for preventing abrasion between the rotating shaft 3 and the rotating shaft support part, such as a lubricant, may be provided to at least one of the rotating shaft 3 and the rotating shaft support part.

The rotating shaft 3 may be supported by bracket 8 through the second bearing 6. The second bearing 6 may be mounted to rotating shaft 3. The second bearing 6 may rotatably support the rotating shaft 3 between the rotating shaft 3 and the bracket 8.

The second bearing 6 may be mounted to the rotating shaft 3 to be spaced apart from the bearing 5. The second bearing 6 may be spaced apart from the bearing 5 in the length direction of the rotating shaft 3.

The bearing 5 and the second bearing 6 may rotatably support the rotating shaft 3 at positions spaced apart from each other. In this case, the weight of the rotating shaft 3 may be distributed by the bearing 5 and the second bearing 6.

The bearing 5 and the second bearing 6 may be mounted to be spaced apart from each other with the rotor 4 interposed therebetween. As another example, the bearing 5 and the second bearing 6 may be mounted to be located together between the rotor 4 and the impeller 71.

The bearing 5 may be located between the rotating shaft 3 and the motor housing 1 to support the rotating shaft 3. In some implementations, the second bearing 6 may be located between the rotating shaft 3 and the bracket 8 to support the rotating shaft 3. In this case, the bearing 5 may be spaced apart from the second bearing 6 with the rotor 4 interposed therebetween.

When the motor M includes both of the bearing 5 and the second bearing 6, the bearing 5 may be a load-side bearing close to the impeller 71, and the second bearing 6 may be a non-load-side bearing distant from the impeller 71. In some implementations, the bearing 5 may be a motor housing-side bearing surrounded by motor housing 1, and the second bearing 6 may be a bracket-side bearing surrounded by the bracket 8.

The bearing 5 may be an end bearing or first bearing mounted at an end portion of the rotating shaft 3, which is opposite to the impeller 71. In some implementations, the second bearing 6 may be a bearing mounted between the impeller 71 and the bearing 5, for example, between the impeller 71 and the rotor 4.

When the second bearing 6 is directly supported by the bracket 8, the outer circumferential surface of the second bearing 6 may come in contact with the bracket 8 to be supported by the bracket 8.

The second bearing 6 may include an inner rim 61 fixed to the rotating shaft 3, an outer rim 62 spaced apart from the inner rim 61, and a rolling member 63 disposed between the inner rim 61 and the outer rim 62.

The second bearing 6 may be one of a roller bearing and a ball bearing. The second bearing 6 is preferably configured as a ball bearing in which the rolling member 63 is configured as a ball to have high performance in high-speed rotation.

The inner rim 61 of the second bearing 6 may be fixed to the rotating shaft 3, and the outer rim 62 of the second bearing 6 may come in contact with the bracket 8 to be fixed to the bracket 8.

The motor M may further include a second O-ring 64 fixed to the rotating shaft 3, the second O-ring 64 supporting the second bearing 6. The second O-ring 64 may be fixed to the rotating shaft 3, and may constitute a rotating shaft assembly (or rotor assembly) together with the rotating shaft 3 and the rotor 4.

The second O-ring 64 may be located between the rotor 4 and the second bearing 6 in the length direction of the rotating shaft 3. The second O-ring 64 may restrict the second bearing 6 from moving toward the rotor 4. The second O-ring 64 may serve as a bearing stopper supporting the second bearing 6.

The second O-ring 64 may be fixed to the rotating shaft 3 to come in contact with a portion of the second bearing 6. At least one portion of the second O-ring 64 may face the inner rim 61 of the second bearing 6. The second O-ring 64 may come in contact with the inner rim 61 of the second bearing 6. The second O-ring 64 may be a bearing stopper that restricts the inner rim 61 of the second bearing 6 from sliding toward the rotor 4.

The second O-ring 64 may be mounted to the rotating shaft 3, come in contact with the inner rim 61 of the second bearing 6, and be spaced apart from a bearing housing part 81 which will be described later.

In some implementations, the bracket 8 may be mounted in at least one of the motor housing 1 and the impeller cover 73.

The bracket 8 may include the bearing housing part 81 coming in contact with the outer rim 62 of the second bearing 6 to be supported by the outer rim 62 of the second bearing 6, the bearing housing part 81 accommodating the second bearing 6 therein.

The bearing housing part 81 may include a hollow cylindrical part of which inner circumferential surface comes in contact with the outer rim 62 of the second bearing 6, and a ring part having a smaller internal diameter than the hollow cylindrical part, the ring part covering between the inner rim 61 of the second bearing 6 and the outer rim 62 of the second bearing 6.

The bearing housing part 81 may be formed larger than the second O-ring 64, and the internal diameter of the bearing housing part 81 of the bracket 8 may be greater than the external diameter of the second O-ring 64. The second O-ring 64 may be rotated in a space formed inside the bearing housing part 81.

A rotating shaft through-hole 83 through which the rotating shaft 3 rotatably passes may be formed in the bearing housing part 81.

The bracket 8 may include a fastening part 84 fastened to at least one of the motor housing 1 and the impeller cover 73. The fastening part 84 may be formed in a ring shape. The fastening part 84 may be fastened to at least one of the motor housing 1 and the impeller cover 73 using a fastening member 85 such as a screw. The fastening part 84 may be formed larger than the bearing housing part 81. The bracket 8 may include at least one connection part 86 connecting the fastening part 84 and the bearing housing part 81.

The bearing 5 and the second bearing 6 are preferably mounted such that their center axes correspond to each other. When the center axes of the bearing 5 and the second bearing 6 do not correspond to each other, the abrasion of any one of the bearing 5 and the second bearing 6 may be large.

In the motor M, the center axis of the bearing housing part 81 and the center axis H1 of the hollow part 12 may not correspond to each other due to an assembly tolerance of the motor housing 1 and the bracket 8.

Although the center axis of the bearing housing 81 and the center axis H1 of the hollow part 12 do not correspond to each other, the elastic mesh 9 of this implementation may adjust the position of the bearing 5 to be aligned with the position of the second bearing 6 such that the center axis B1 of the bearing 5 and the center axis of the second bearing 6 correspond to each other.

The elastic mesh 9 may be disposed between the hollow part 12 and the bearing 5, and may elastically support the bearing 5. The elastic mesh 9 may be press-fitted between the bearing 5 and the hollow part 12.

In the motor M, the concentricities of the bearing 5 and the second bearing 6 may not correspond to each other due to the assembly tolerance of the motor housing 1 and the bracket 8. When the concentricities of the bearing 5 and the second bearing 6 do not correspond to each other, the elastic mesh 9 may support the bearing 5 such that the concentricities of the bearing 5 and the second bearing 6 correspond to each other in a state in which a portion of the elastic mesh 9 is elastically compressed by the bearing 5.

For example, the bearing 5, as shown in FIG. 3, may pressurize a portion of the elastic mesh 9 in the state in which the center axis B1 of the bearing 5 does not correspond to the center axis H1 of the hollow part 12. In this case, the elastic mesh 9 may support the bearing 5 in the state in which the portion pressurized by the bearing 5 is compressed.

The elastic mesh 9 is preferably formed in a structure in which the elastic mesh 9 is easily elastically deformed, and heat transferred from the bearing 5 is easily dissipated.

The plurality of pores S2 and S3 may be formed in the elastic mesh 9. The elastic mesh 9 may be disposed between the hollow part 12 and the bearing 5 to come in contact with at least one of the hollow part 12 and the bearing 5.

The elastic mesh 9 may have a hollow cylindrical shape. A cylindrical empty space may be formed inside the elastic mesh 9.

At least a portion of the elastic mesh 9 may be disposed between the outer circumference of the outer rim 52 of the bearing 5 and the inner circumference of the hollow part 12. The elastic mesh 9 may come in contact with each of the outer rim 52 and the hollow part 12.

The height L1 of the elastic mesh 9 may be greater than the height L2 of the bearing 5. A portion of the elastic mesh 9 may be disposed between the outer rim 52 of the bearing 5 and the hollow part 12. The internal diameter of the elastic mesh 9 may be equal to or smaller than the external diameter of the outer rim 52 of the bearing 5. In some implementations, the external diameter of the elastic mesh 9 may be equal to or greater than the internal diameter of the hollow part 12.

A portion of the elastic mesh 9 may be press-fitted between the outer rim 52 of the bearing 5 and the hollow part 12, and may be fixed between the outer rim 52 of the bearing 5 and the hollow part 12 in the state in which the portion of the elastic mesh 9 is press-fitted. In some implementations, the internal diameter D4 of the elastic mesh 9 may be greater than the external diameter D3 of the outer ring 56 of the O-ring 54.

The elastic mesh 9 may include a first area 9A that faces the bearing 5 and a second area 9B that does not face the bearing 5.

The first area 9A of the elastic mesh 9 may face the bearing accommodation space S1. The second area 9B of the elastic mesh 9 may include an area that faces the O-ring 54. The second area 9B of the elastic mesh 9 may further include an area that does not face both of the bearing accommodation space S1 and the O-ring 54.

The elastic mesh 9 may have one end 94 mounted on the body part 13. The one end 94 of the elastic mesh 9 may come in contact with the body part 13. When the one end 94 of the elastic mesh 9 comes in contact with the body part 13, the one end 94 of the elastic mesh 9 may be held by the body part 13, and the mounting position of the elastic mesh 9 may be determined by the body part 13.

In some implementations, the elastic mesh 9 may be protected by the outer rim 52 of the bearing 5, the hollow part 12, and the body part 13.

In some implementations, the elastic mesh 9 may have the other end 95 spaced apart from the rotor 4, the other end 95 facing the rotor 4. The other end of the elastic mesh 9 may be located at the outside of the bearing accommodation space S1.

The elastic mesh 9 may include a metal wire mesh in which at least one metal wire 91 is regularly or irregularly tangled. For example, the metal wire 91 may have a shape that includes a plurality of curved sections such as a curled shape, a twisted shape, a wound shape, and a spiral shape, or the like.

Heat of the bearing 5 may be transferred to the metal wire 91, and the heat transferred to the metal wire 91 may be transferred to the hollow part 12 through a hollow part contact part 92 of the metal wire 91, which comes in contact with the hollow part 12.

In some implementations, the heat transferred to the metal wire 91 may be dissipated in an air cooling manner through the second area 9B of the metal wire 91, which does not face the bearing 5.

For example, the heat of the bearing 5 may be transferred to the motor housing 1 through the elastic mesh 9, and the heat transferred to the motor housing 1 may be transferred to air in the motor M through the elastic mesh 9.

The plurality of pores S2 and S3 may be open in the radial direction of the elastic mesh 9. The plurality of pores S2 and S3 may include at least one first pore S2 that faces the outer rim 52 of the bearing 5 and at least one second pore S3 that does not face the outer rim 52 of the bearing 5.

The second pore S3 may be located at the outside of the bearing accommodation space S1, and the air inside the motor M may be introduced into the elastic mesh 9 through the second pore S3.

Hereinafter, heat dissipation of the bearing according to this implementation will be described in detail as follows.

In the motor M, when the rotating shaft 3 rotates, the impeller 71 may be rotated, and air may be sucked into the impeller 71 through the air inlet 72.

The air sucked into the impeller 71 may be flowed into the diffuser 74, and the air flowed into the diffuser 74 may be sequentially guided by the diffuser vane 76 and the guide vane 77.

The air guided by the guide vane 77 may be flowed into the stator 2 and the rotor 4, and may dissipate heat of the stator 2 and the rotor 4 in the air cooling manner inside the motor M.

A portion of the air inside the motor M may be introduced into the bearing accommodation space S1 through the gap G1 between the O-ring 54 and the elastic mesh 9, and the air introduced into the bearing accommodating space S1 may be introduced between the outer rim 52 of the bearing 5 and the hollow part 12 through the plurality of pores S2 and S3 formed in the elastic mesh 9.

At least a portion of the air may pass between the outer rim 52 of the bearing 5 and the hollow part 12 through the plurality of pores S2 and S3 formed in the elastic mesh 9, come in contact with each of the bearing 5, the elastic mesh 9, and the hollow part 12 between the outer circumferential surface of the bearing and the hollow part 12, and absorb heat of each of the bearing 5, the elastic mesh 9, and the hollow part 12.

The air dissipating the heat of the bearing 5, the elastic mesh 9, and the hollow part 12 may be discharged to the outside of the motor housing 1 through the through-hole 14 facing the elastic mesh 9.

Figure 5:
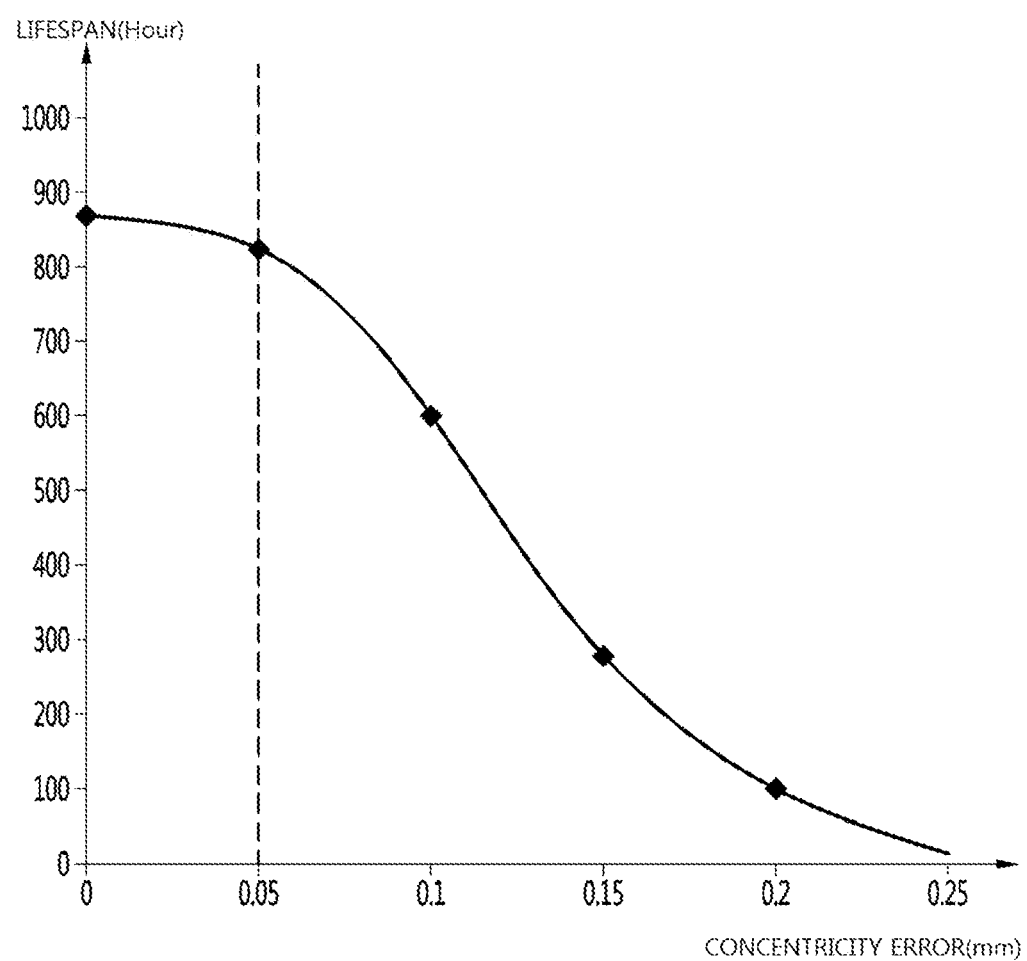
FIG. 5 is an example lifespan graph of example bearings with respect to their concentricity error.

FIG. 5 is an example graph of lifespan of example bearings with respect to their concentricity error.

For instance, FIG. 5 is an example graph showing lifespan of each bearing with respect to its concentricity error between the bearing 5 and the second bearing 6, shown in FIG. 1. When the concentricity error between the bearing 5 and the second bearing 6 is, for example, 0.05 mm or less, the lifespan of each bearing can be highly maintained. When the concentricity error between the bearing 5 and the second bearing 6 is 0.05 mm or more, the lifespan of each bearing may be rapidly decreased as shown in FIG. 5.

In this example, the concentricity error between the bearing 5 and the second bearing 6 of this implementation may be maintained to be 0.05 mm or less for a longer lifespan. In this implementation, although the center axis of the bearing 5 and the center axis of the second bearing 6 may not align to each other, the elastic mesh 9 elastically deformed by the bearing 5 may maintain the center axis of the bearing 5 and the center axis of the second bearing 6 to have an error of 0.05 mm or less, and thus the lifespan of each of the bearing 5 and the second bearing 6 can be maximized.

Figure 6:
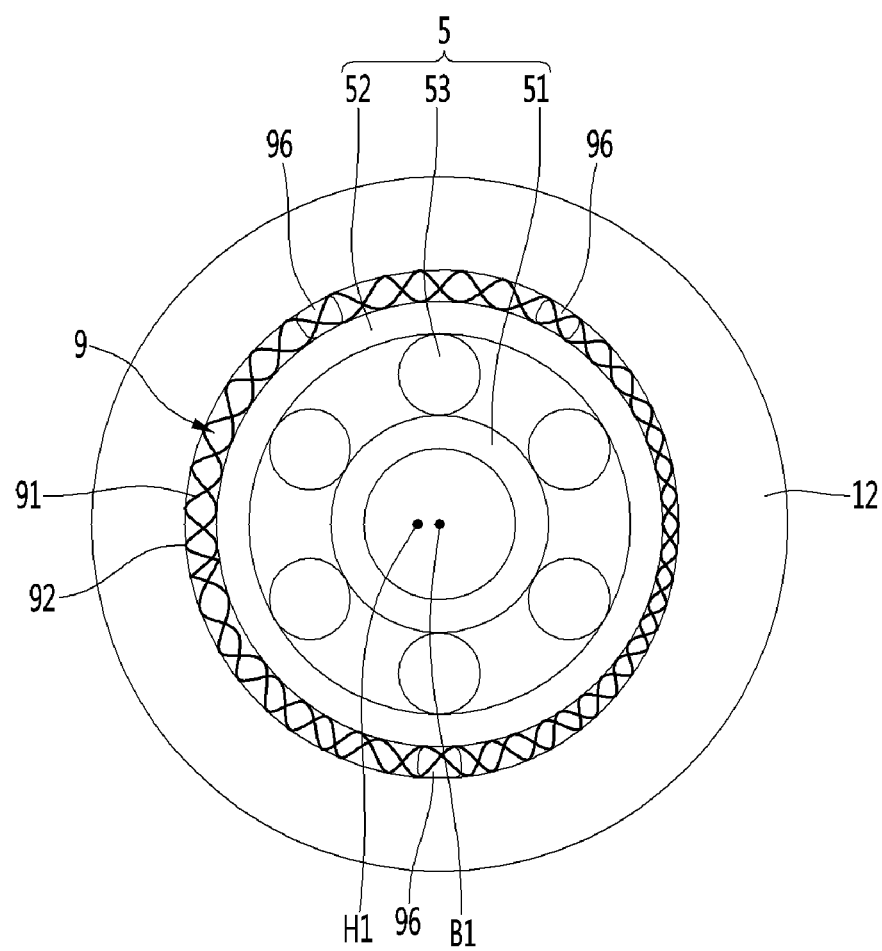
FIG. 6 is a sectional view showing another example elastic mesh.

FIG. 6 is a sectional view showing another example of the elastic mesh shown in FIG. 4.

The motor M of this implementation may include an example thermal conductive adhesive 96 that fixes the elastic mesh 9 to at least one of the outer circumferential surface of the bearing 5 and the hollow part 12.

The thermal conductive adhesive 96 may be located between the outer rim 52 of the bearing 5 and the hollow part 12.

The thermal conductive adhesive 96 may restrict the elastic mesh 9 from being arbitrarily separated between the outer rim 52 of the bearing 5 and the hollow part 12.

The thermal conductive adhesive 96 may be formed at a plurality of portions between the outer rim 52 of the bearing 5 and the hollow part 12.

Air introduced into the elastic mesh 9 may be diffused into the elastic mesh 9 while passing between the thermal conductive adhesives 96.

Figure 7:
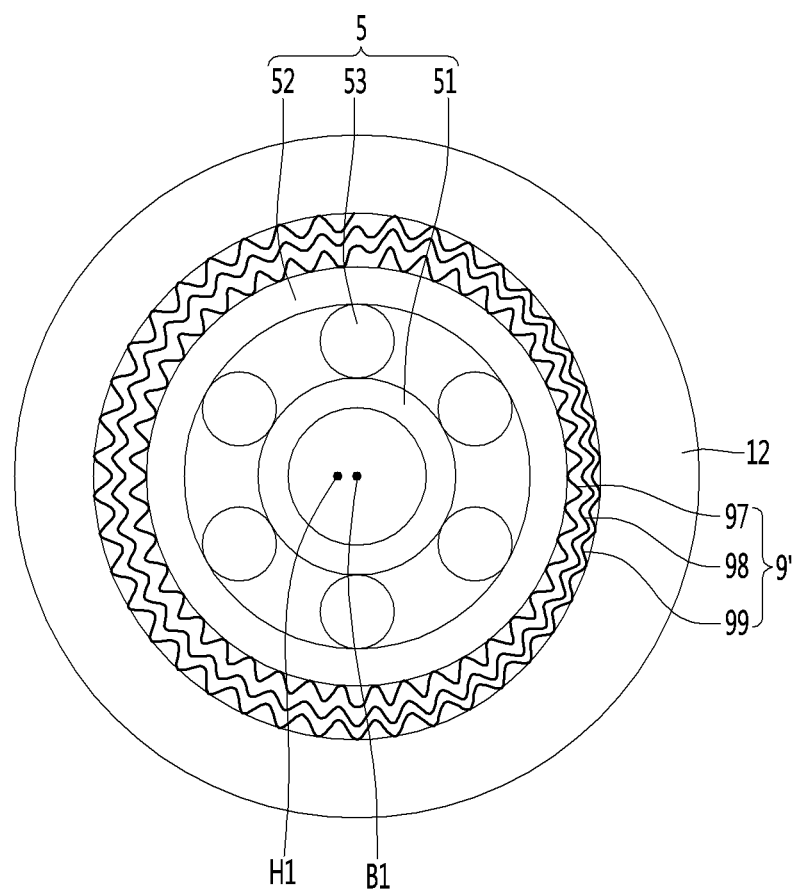
FIG. 7 is a sectional view showing another example elastic mesh.

FIG. 7 is a sectional view showing still another example of the elastic mesh shown in FIG. 4.

An example elastic mesh 9' of this implementation may have a shape in which a mesh part having a plurality of pores formed therein is curled at least twice.

The elastic mesh 9' may be manufactured by curling, plural times, a strip-shaped mesh part in a scroll form. The strip-shaped mesh part may be formed of a metal having a high heat transfer performance. The strip-shaped mesh part may be configured such that a plurality of metal wires are irregularly coupled, or may be configured such that a plurality of metal wires are arranged in a regular pattern such as a grid pattern.

In the elastic mesh 9', an inner mesh part 97 located at the innermost side in the radial direction may come in contact with the outer circumferential surface of the bearing 5. In some implementations, an outer mesh part 99 located at the outermost side in the radial direction may come in contact with the hollow part 12. At least a portion of the outer mesh part 99 may come in contact with the inner circumferential surface of the hollow part 12.

In some implementations, the elastic mesh 9' may further include at least one center mesh part 98 located between the inner mesh part 97 and the outer mesh part 99. The center mesh part 98 may be curled to surround the inner mesh part 97, and the outer mesh part 99 may be curled to surround the center mesh part 98.

The elastic mesh 9' of this implementation may include the inner mesh part 97 and the outer mesh part 99 without the center mesh part 98. In this case, the outer mesh part 99 may be curled to surround the inner mesh part 97.

In this implementation, the elastic mesh 9' formed in a hollow cylindrical shape can be manufactured through a simple process of curling, plural times, one strip-shaped mesh part in a scroll form. In addition, heat can be dissipated through not only the pores formed in the mesh part but also pores between the mesh parts 97, 98, and 99 sequentially arranged in the radial direction.

Figure 8:
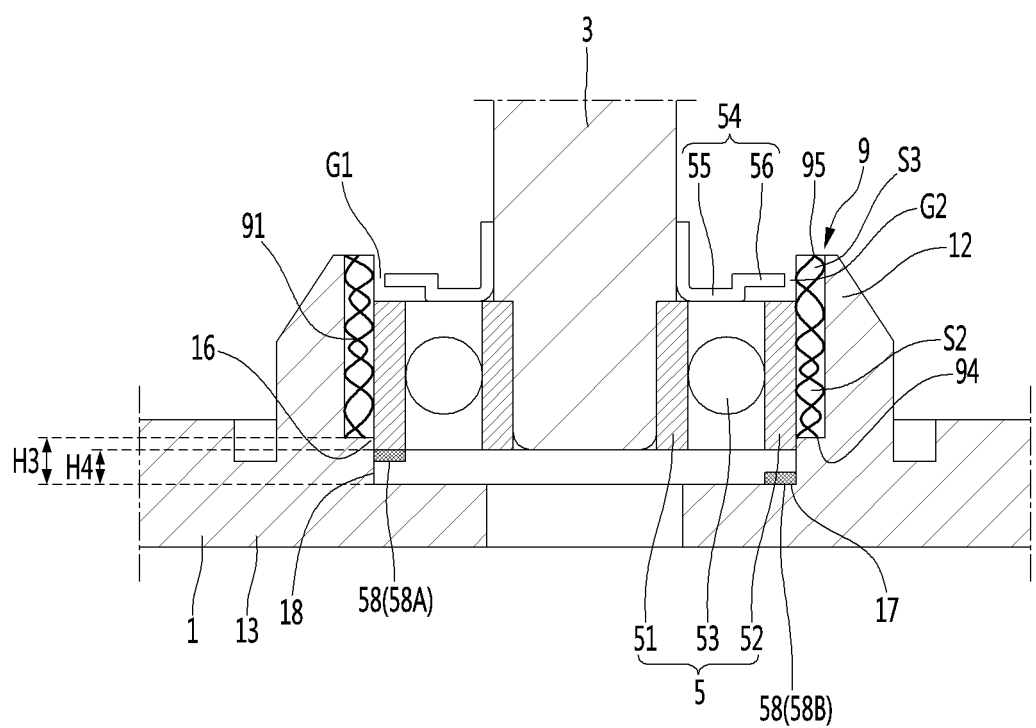
FIG. 8 is an enlarged sectional view showing example main parts of another example motor.

FIG. 8 is an enlarged sectional view showing main parts of another example motor.

The motor of this implementation may include a wave washer 58 disposed between an outer rim 52 of a bearing 5 and a body part 13. In addition, a mounting projection 16 on which an elastic mesh 9 is mounted to be spaced apart from the wave washer 58 may protrude from the body part 13.

The other components except the wave washer 58 and the mounting projection 16 are identical to those of the first implementation described above. Therefore, those components are designated by like reference numerals, and their detailed descriptions will be omitted.

The wave washer 58 may be formed in a ring shape, for instance. The wave washer 58 may include a convex part 58A formed convex toward the outer rim 52 of the bearing 5 to come in contact with the outer rim 52 of the bearing 5, and a concave part 58B recessed in a direction distant from the outer rim 52 of the bearing 5 to be spaced apart from the outer rim 52 of the bearing 5. The convex part 58A and the concave part 58B may be alternately formed in the circumferential direction of the wave washer 58.

The wave washer 58 may be disposed between the outer rim 52 of the bearing 5 and the body part 13 such that the convex part 58A can come in contact with the outer rim 52 of the bearing 5.

When the outer rim 52 of the bearing 5 is vibrated, the wave washer 58 is elastically deformed between the outer rim 52 of the bearing 5 and the body part 13, to buffer and absorb vibration transferred to the outer rim 52 of the bearing 5 and to minimize noise of the bearing 5.

In some implementations, the body part 13 may include a wave washer mounting surface 17 on which the wave washer 58 is mounted. The wave washer mounting surface 17 may be formed flat at a portion of the body part 13, which is opposite to the outer rim 52 of the bearing 5.

In some implementations, the mounting projection 16 may be formed to be stepped with the wave washer mounting surface 17. The mounting projection 16 may be formed higher than the wave washer mounting surface 17.

The height H3 of the mounting projection 16 may be greater than the height H4 of the wave washer 58.

One end 94 of the elastic mesh 9 may be disposed to come in contact with the mounting projection 16. When the one end 94 of the elastic mesh 9 is mounted on the mounting projection 16, the elastic mesh 9 may be held by the mounting projection 16 such that the position of the elastic mesh 9 is determined.

A portion of a metal wire 91 constituting the elastic mesh 9 may become loose as time elapses. When the mounting projection 16 is not provided, the loose portion may be entered between the outer rim 52 of the bearing 5 and the wave washer 58. In this case, the wave washer 58 may be erroneously operated due to the portion of the metal wire 91, which is entered between the outer rim 52 of the bearing 5 and the wave washer 58.

In some implementations, a portion of the elastic mesh 9, which is close to the wave washer 58, may be bent toward the wave washer 58 in the state in which the elastic mesh 9 maintains the hollow cylindrical shape. When the mounting projection 16 is not provided, the bent portion may be entered between the outer rim 52 of the bearing 5 and the wave washer 58. In this case, the wave washer 58 may be erroneously operated due to the portion of the elastic mesh 9, which is entered between the outer rim 52 of the bearing 5 and the wave washer 58.

In some implementations, when the mounting projection 16 is provided to a motor housing 1, and the elastic mesh 9 is mounted on the mounting projection 16, the loose portion of the metal wire 91 or the bent portion of the elastic mesh 9 is blocked by the mounting projection 16, not to be entered between the outer rim 52 of the bearing 5 and the wave washer 58.

In this implementation, the reliability of the wave washer 58 can be improved as compared with when the mounting projection 16 is not provided, and the erroneous operation of the wave washer 58 can be minimized.

The mounting projection 16 may be formed larger than the wave washer 58. When the wave washer 58 is mounted on the wave washer mounting surface 17, the mounting projection 16 may surround the outer circumference of the wave washer 58.

The mounting projection 16 may include a side surface 18 facing the outer circumferential surface of the wave washer 58. The side surface 18 of the mounting projection 16 may be formed in a circular shape, and the wave washer 58 may be disposed to be surrounded by the side surface 18 of the mounting projection 16.

In some implementations, the diameter of the side surface 18 of the mounting projection 16 may be formed to be equal to or slightly greater than the external diameter of the wave washer 58.

When the position of the wave washer 58 is moved, the outer circumference of the wave washer 58 may be held by the side surface 18 of the mounting projection 16. Thus, the movement of the position of the wave washer 58 can be minimized, and the wave washer 58 can reduce vibration of the outer rim 52 of the bearing 5 with high reliability.

Figure 9:
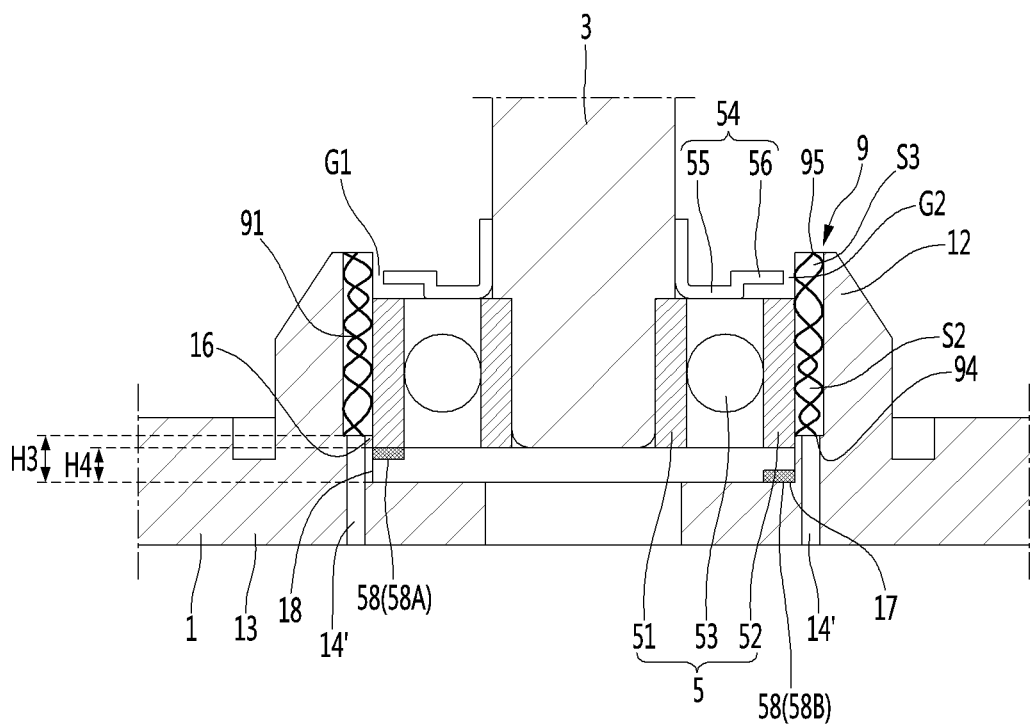
FIG. 9 is an enlarged sectional view showing example main parts of another example motor.

FIG. 9 is an enlarged sectional view showing example main parts of another example motor.

In this implementation, at least one through-hole 14' may be formed in a body part 13. The through-hole 14' may be formed to pass through a mounting projection 16. The other components except the through-hole 14' are identical to those of the other implementations described above. Therefore, those components are designated by like reference numerals, and their detailed descriptions will be omitted.

The through-hole 14' may be formed from the outer surface of the body part 13, which faces the outside of a motor housing 1, to the inner surface of the mounting projection 16, which faces the inside of the motor housing 1.

The through-hole 14' may be formed at a portion except a side surface 18 of the mounting projection 16, and an elastic mesh 9 does not come in contact with a wave washer 58 through the through-hole 14'.

Figure 10:
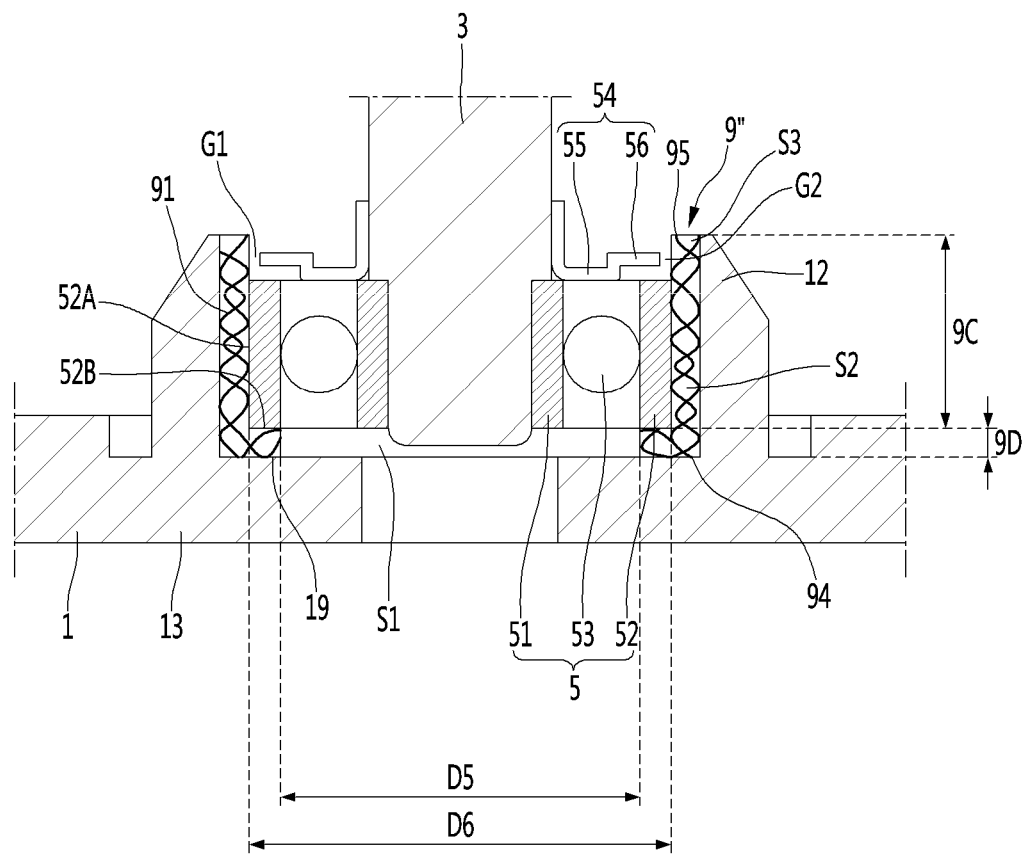
FIG. 10 is an enlarged sectional view showing example main parts of another example motor.

FIG. 10 is an enlarged sectional view showing example main parts of another example motor.

An example elastic mesh 9" may include a first elastic mesh part 9C disposed between the inner circumference of a hollow part 12 and the outer circumference of an outer rim 52 of a bearing 5, and a second elastic mesh part 9D bent from the first elastic mesh part 9C, the second elastic mesh part 9D being disposed between the outer rim 52 of the bearing 5 and a body part 13. The other components except the elastic mesh 9" are identical or similar to those of the other implementations described above. Therefore, those components are designated by like reference numerals, and their detailed descriptions will be omitted.

A second elastic mesh part mounting surface 19 on which the second elastic mesh part 9D is mounted may be formed at the body part 13.

The first elastic mesh part 9C may be formed in a hollow cylindrical shape. The first elastic mesh part 9C may come in contact with an outer circumferential surface 52A of the outer rim 52 of the bearing 5.

The first elastic mesh part 9C may be compressed/stretched in the radial direction by the outer rim 52 of the bearing 5. The first elastic mesh part 9C may absorb vibration and impact applied to the bearing 5 in the radial direction. The first elastic mesh part 9C may be elastically deformed by the bearing 5 to align the position of the bearing 5.

The second elastic mesh part 9D may be formed in a ring shape. The internal diameter D5 of the second elastic mesh part 9D may be formed smaller than the internal diameter D6 of the first elastic mesh part 9C. The second elastic mesh part 9D may come in contact with a surface 52B perpendicular to the outer circumferential surface of the outer rim 52 of the bearing 5.

The second elastic mesh part 9D may be compressed/stretched in a direction parallel to a rotating shaft 3 by the outer rim 52 of the bearing 5. The second elastic mesh part 9D may assist the alignment of the position of the bearing 5 while absorbing vibration and impact applied to the bearing 5 in the height direction.

In this example, one elastic mesh 9" can serve as each of the elastic mesh 9 and the wave washer 58, and may not include a separate structure such as the mounting projection 16. In this implementation, it may be possible to decrease the number of parts and to simplify the structure.

Figure 11:
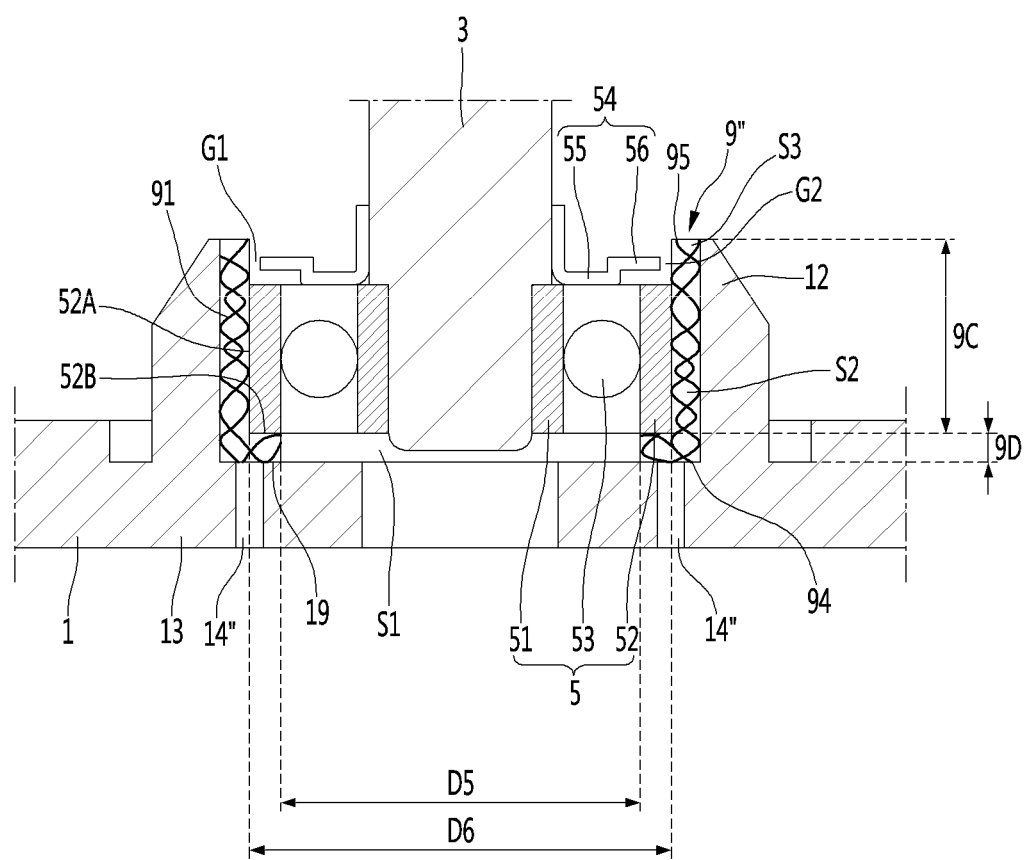
FIG. 11 is an enlarged sectional view showing main example parts of another example motor.

FIG. 11 is an enlarged sectional view showing example main parts of another example motor.

In this implementation, at least one through-hole 14" may be formed in a body part 13. The through-hole 14" may be formed to face at least one of a first elastic mesh part 9C and a second elastic mesh part 9D. The other components except the through-hole 14" are identical or similar to those of the other implementations described above. Therefore, those components are designated by like reference numerals, and their detailed descriptions will be omitted.

The through-hole 14" may be formed to have a position and a size, where the through-hole 14" faces each of the first elastic mesh part 9C and the second elastic mesh part 9D.

Air inside the motor M may pass through pores of each of the first elastic mesh part 9C and the second elastic mesh part 9D and be then discharged to the outside of the motor M through the through-hole 14".

Although some implementations of the present disclosure are described for illustrative purposes, it will be apparent to those skilled in the art that various modifications and changes can be made thereto within the scope of the disclosure without departing from the essential features of the disclosure.

Accordingly, the aforementioned implementations should be construed not to limit the technical spirit of the present disclosure but to be provided for illustrative purposes so that those skilled in the art can fully understand the spirit of the present disclosure.

The scope of the present disclosure should not be limited to the aforementioned implementations but defined by appended claims. The technical spirit within the scope substantially identical with the scope of the present disclosure will be considered to fall in the scope of the present disclosure defined by the appended claims.

What is claimed is:

1. A motor comprising:
   a motor housing;
   a rotating shaft assembly that includes a rotating shaft and a rotor mounted to the rotating shaft;
   an impeller connected to the rotating shaft;
   an impeller cover that surrounds an outer circumference of the impeller, the impeller cover defining an air inlet;

a stator that is located within the motor housing and that surrounds at least a portion of the rotor;
a bearing mounted to the rotating shaft, the bearing comprising:
an inner rim fixed to the rotating shaft,
an outer rim spaced apart from the inner rim, and
a rolling member disposed between the inner rim and the outer rim; and
an elastic mesh having a plurality of pores, the elastic mesh being disposed between the motor housing and the bearing,
wherein the motor housing comprises:
a body part, the body part including a mounting projection that protrudes from the body part and that seats the elastic mesh, and
a hollow part that protrudes from the body part and that surrounds an outer circumference of the elastic mesh,
wherein at least a portion of the elastic mesh is disposed between an inner circumference of the hollow part and an outer circumference of the outer rim,
wherein the motor further comprises a wave washer that is disposed between the outer rim and the body part and spaced apart from the elastic mesh, and
wherein the mounting projection surrounds an outer circumference of the wave washer.

2. The motor according to claim 1,
wherein the hollow part has an internal diameter greater than an external diameter of the outer rim of the bearing.

3. The motor according to claim 2, wherein the elastic mesh contacts the outer rim and the hollow part.

4. The motor according to claim 1, wherein the mounting projection has a height greater than a height of the wave washer.

5. The motor according to claim 1, wherein the body part includes a wave washer mounting surface that seats the wave washer, and
wherein the mounting projection is stepped from the wave washer mounting surface.

6. A motor comprising:
a motor housing;
a rotating shaft assembly that includes a rotating shaft and a rotor mounted to the rotating shaft;
an impeller connected to the rotating shaft;
an impeller cover that surrounds an outer circumference of the impeller, the impeller cover defining an air inlet;
a stator that is located within the motor housing and that surrounds at least a portion of the rotor;
a bearing mounted to the rotating shaft, the bearing comprising:
an inner rim fixed to the rotating shaft,
an outer rim spaced apart from the inner rim, and
a rolling member disposed between the inner rim and the outer rim; and
an elastic mesh having a plurality of pores, the elastic mesh being disposed between the motor housing and the bearing,
wherein the motor housing comprises:
a body part, and
a hollow part that protrudes from the body part and that surrounds an outer circumference of the elastic mesh,
wherein at least a portion of the elastic mesh is disposed between an inner circumference of the hollow part and an outer circumference of the outer rim, and
wherein the elastic mesh comprises:
a first elastic mesh part disposed between the inner circumference of the hollow part and the outer circumference of the outer rim, and
a second elastic mesh part bent from the first elastic mesh part and disposed between the outer rim and the body part.

7. The motor according to claim 6, wherein the body part defines a through-hole that faces at least one of the first elastic mesh part or the second elastic mesh part.

8. The motor according to claim 1, wherein the elastic mesh comprises a metal wire mesh in which at least one metal wire has a shape including one or more of curved sections.

9. The motor according to claim 1, wherein the elastic mesh has a hollow cylindrical shape, and
wherein each pore of the plurality of pores has an opening in a radial direction of the elastic mesh.

10. The motor according to claim 1, wherein the elastic mesh has a height greater than a height of the bearing.

11. The motor according to claim 1, further comprising an O-ring that is fixed to the rotating shaft, that is located between the elastic mesh and the rotating shaft, and that supports the bearing,
wherein the O-ring has an external diameter less than an internal diameter of the elastic mesh to thereby define a gap between an outer circumference of the O-ring and the elastic mesh.

12. The motor according to claim 1, wherein the elastic mesh is configured to deform in a radial direction based on the rotating shaft becoming offset from a center axis of the bearing.

13. The motor according to claim 1, wherein the elastic mesh is configured to communicate air through a through-hole defined at the body part and to discharge air to an outside of the motor housing.

14. A motor comprising:
a motor housing;
a rotating shaft assembly that includes a rotating shaft and a rotor mounted to the rotating shaft;
an impeller connected to the rotating shaft;
an impeller cover that surrounds an outer circumference of the impeller, the impeller cover defining an air inlet;
a stator that is located within the motor housing and that surrounds at least a portion of the rotor;
a bearing mounted to the rotating shaft, the bearing comprising:
an inner rim fixed to the rotating shaft,
an outer rim spaced apart from the inner rim, and
a rolling member disposed between the inner rim and the outer rim; and
an elastic mesh having a plurality of pores, the elastic mesh being disposed between the motor housing and the bearing,
wherein the motor housing comprises:
a body part, the body part including a mounting projection that protrudes from the body part and that seats the elastic mesh, and
a hollow part that protrudes from the body part and that surrounds an outer circumference of the elastic mesh,
wherein at least a portion of the elastic mesh is disposed between an inner circumference of the hollow part and an outer circumference of the outer rim,
wherein the motor further comprises a wave washer that is disposed between the outer rim and the body part and spaced apart from the elastic mesh, and wherein the mounting projection has a first surface that contacts the elastic mesh and a second surface that contacts the wave washer.

15. The motor according to claim 6, wherein the second elastic mesh part contacts both of the body part and the outer rim of the bearing.

16. The motor according to claim 6, wherein the second elastic mesh part defines a space between the body part and the inner rim of the bearing and is configured to deform in a direction parallel with the rotating shaft.

* * * * *